March 3, 1959  W. K. RAU, JR  2,875,512
SELECTIVE GROMMET INSERTING APPARATUS
Filed April 4, 1955  5 Sheets-Sheet 1

INVENTOR.
W. K. RAU, JR.
BY *[signature]*
ATTORNEY

March 3, 1959 — W. K. RAU, JR — 2,875,512
SELECTIVE GROMMET INSERTING APPARATUS
Filed April 4, 1955 — 5 Sheets-Sheet 4

INVENTOR.
W. K. RAU, JR.
BY *[signature]*
ATTORNEY

INVENTOR.
W. K. RAU, JR.
BY
ATTORNEY

United States Patent Office 2,875,512
Patented Mar. 3, 1959

2,875,512

SELECTIVE GROMMET INSERTING APPARATUS

William K. Rau, Jr., Fullerton, Md., assignor to Western Electric Company, Incorporated, New York, N. Y., a corporation of New York Application April 4, 1955, Serial No. 498,864

3 Claims. (Cl. 29—208)

This invention relates to assembling apparatus, and more particularly to apparatus for assembling grommets in apertures in cable terminal boxes.

One operation in the manufacture of cable terminal assemblies involves the insertion of a plurality of soft rubber grommets into a plurality of equally spaced apertures formed in cable terminal boxes. The cable terminal boxes may be of various sizes having different numbers of apertures formed therein. For example, in the manufacture of one type of cable terminal assembly, such cable terminal boxes are of three standard sizes having 10, 16 or 26 apertures respectively. Rather than to provide separate apparatus for accommodating the several different sizes of cable terminal boxes, it is desirable to provide a single apparatus which is capable of performing grommet inserting operations on cable terminal boxes of all sizes.

It is an object of this invention to provide new and improved assembling apparatus.

It is another object of this invention to provide new and improved apparatus for assembling rubber grommets in apertures in cable terminal boxes.

Apparatus illustrating certain features of the invention may include a plurality of grommet inserting means for forcing grommets into apertures in an article and means for operating the grommet inserting means. An electrical circuit is provided for selectively controlling the operating means to effect the operation of predetermined groups of the grommet inserting means in preselected sequences.

A complete understanding of the invention may be obtained from the following detailed description of a specific embodiment thereof, when read in conjunction with the appended drawings, in which.

Figure 1:
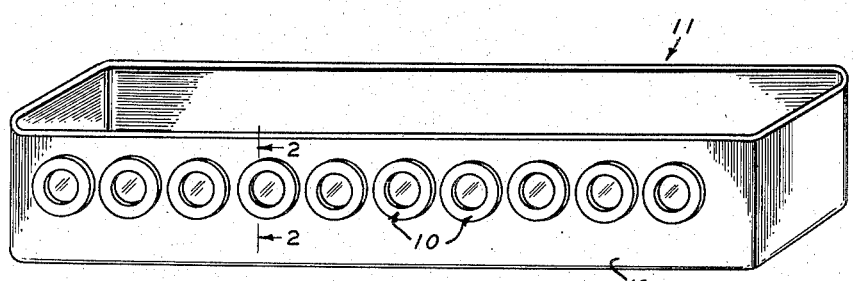
Fig. 1 is a perspective view of a finished cable terminal box provided with rubber grommets.
Figure 2:
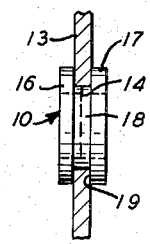
Fig. 2 is an enlarged, fragmentary vertical section taken along line 2—2 of Fig. 1.

Referring now to the drawings, there is shown an apparatus designed to insert a plurality of rubber grommets 10—10 in a cable terminal box 11 (Fig. 1). The terminal box 11 comprises a five-walled structure having an open top. One side wall 13 of the box 11 is provided with a plurality of circular apertures 14—14 designed to receive the grommets 10—10. The particular cable terminal box 11 illustrated in Fig. 1 is provided with ten equally spaced, circular apertures 14—14. The rubber grommets 10—10 (Fig. 2) are of a conventional construction, and each grommet has an outer peripheral flange 16 and an inner peripheral flange 17 connected by a small cylindrical boss 18, leaving an annular groove 19 between the flanges. The grommets 10—10 are designed to engage the opposite sides of the wall 13 when assembled in the apertures 14—14 therein.

Figure 3:
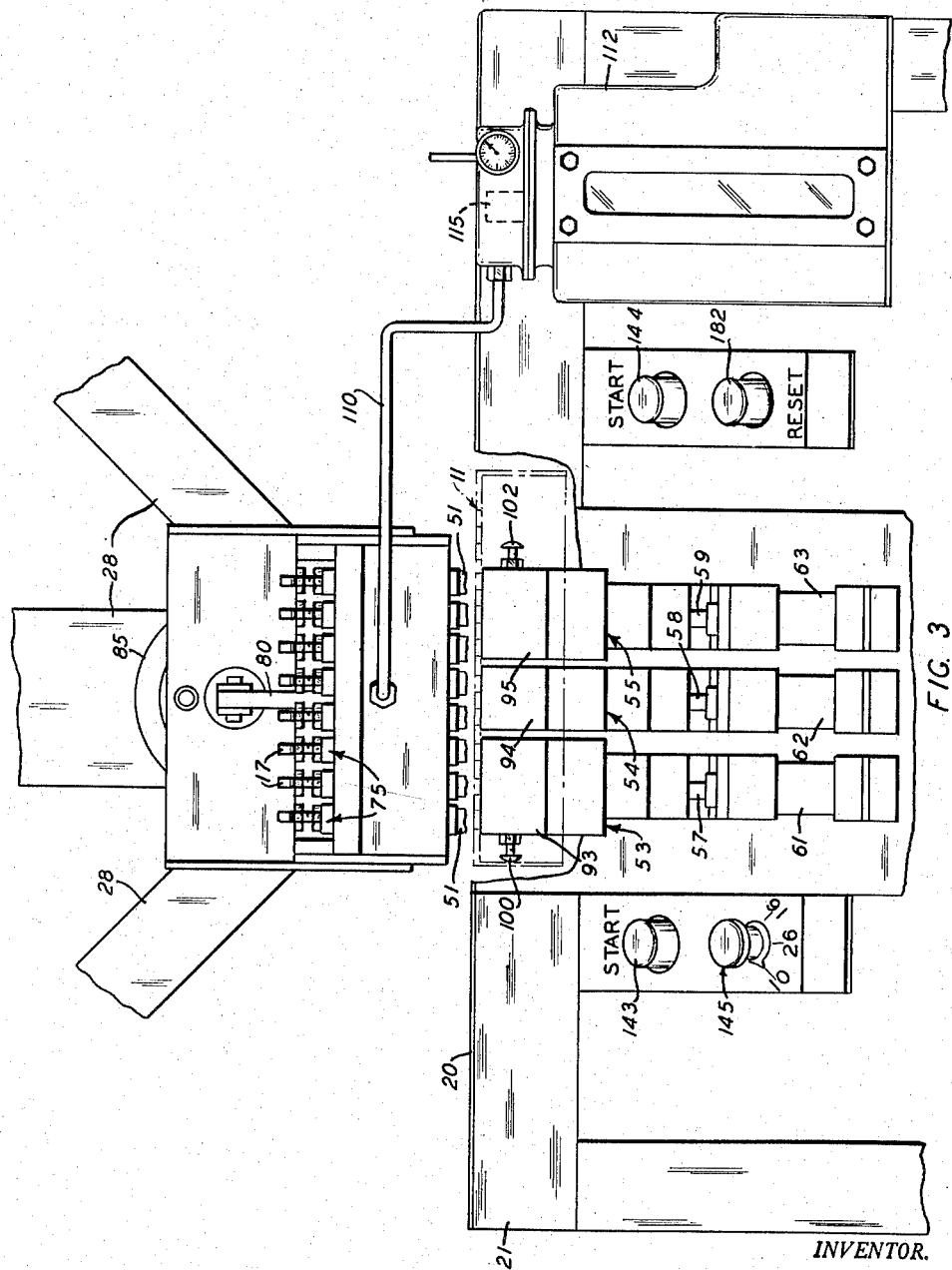
Fig. 3 is a partial, front elevation of an apparatus for inserting rubber grommets in apertures in cable terminal boxes, with parts thereof broken away.
Figure 4:
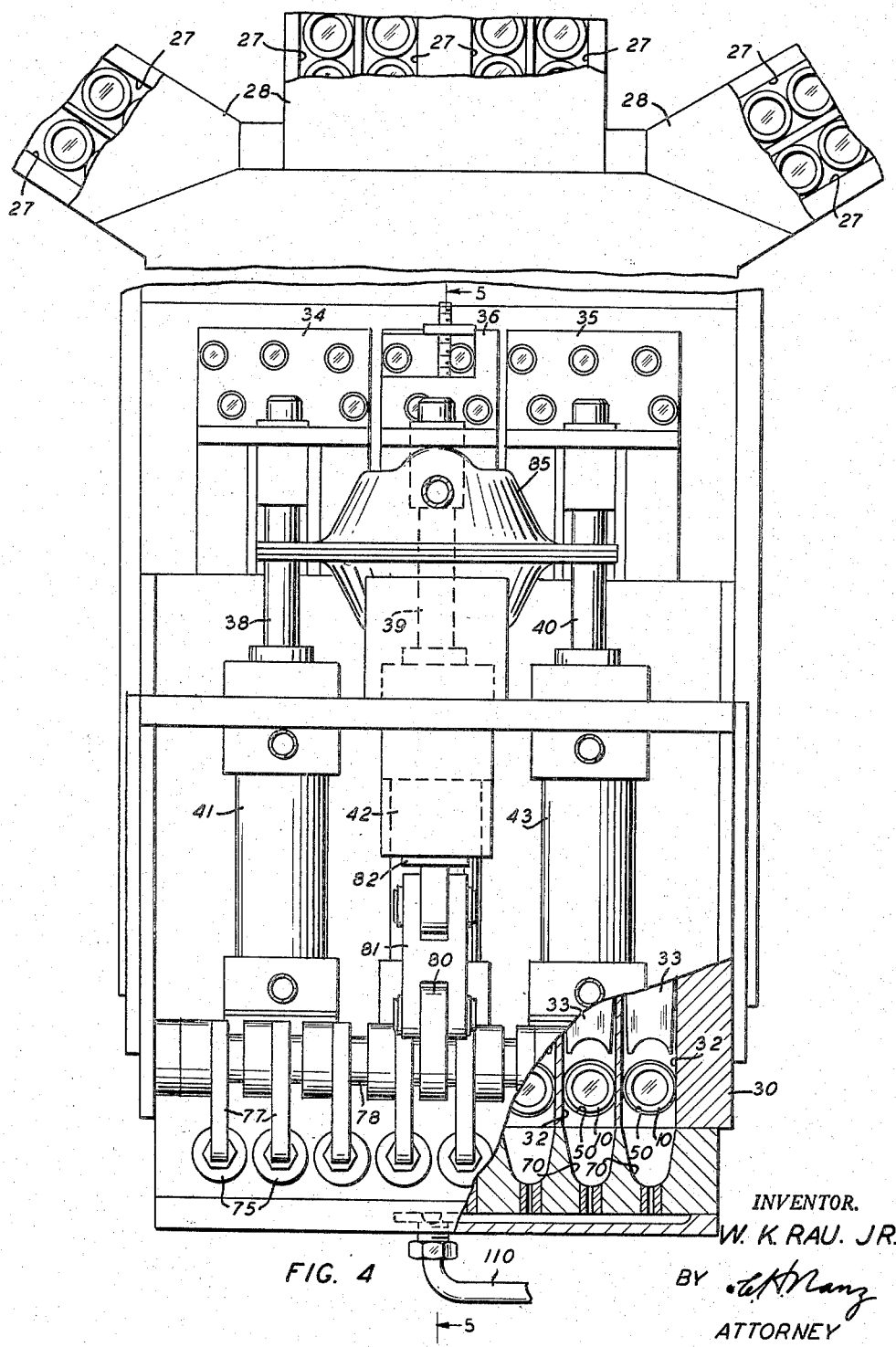
Fig. 4 is an enlarged, top plan view of portions of the apparatus shown in Fig. 3, with parts thereof broken away.
Figures 5, 6:
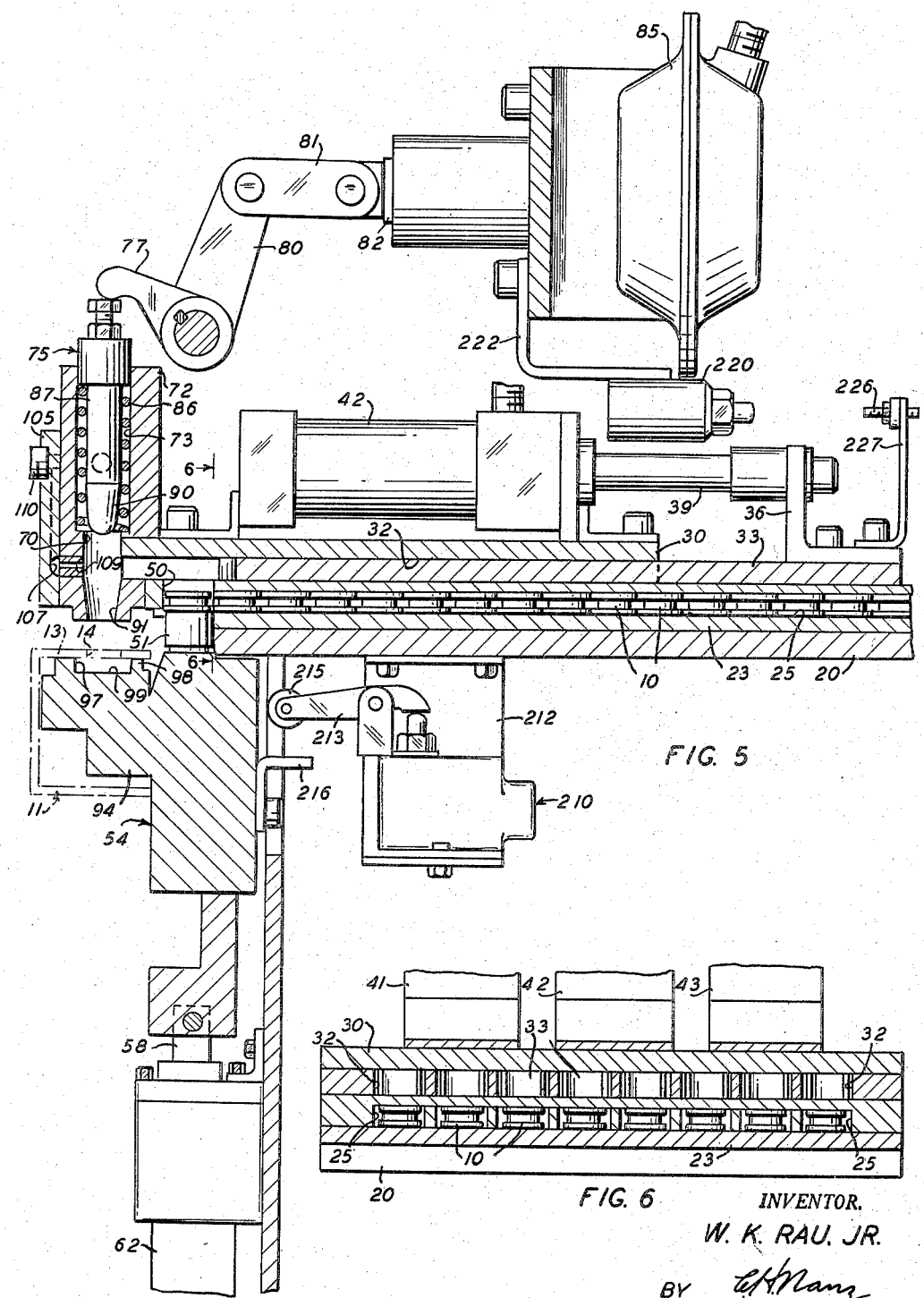
Fig. 5 is an enlarged, fragmentary, vertical section taken along line 5—5 of Fig. 4.
Fig. 6 is a fragmentary, vertical section taken along line 6—6 of Fig. 5.

Referring now to Fig. 3, the grommet inserting apparatus includes a platform 20 supported horizontally on a bench-like structure 21. Mounted fixedly on the platform 20 is a guide plate 23 (Fig. 5) provided with eight equally spaced guide passages 25—25 (Figs. 5 and 6). Eight continuous columns of rubber grommets 10—10 are advanced through the guide passages 25—25 from associated gravity feed chutes 27—27 (Fig. 4) formed in hoppers 28—28. A slide plate 30 (Fig. 5) is mounted fixedly upon the guide plate 23 and has eight slideways 32—32 (Figs. 4, 5 and 6) formed therein, which are positioned above and in alignment with corresponding guide passages 25—25 in the guide plate.

Elongated feed rams 33—33 (Figs. 4 and 5) are slidably mounted for reciprocation within the slideways 32—32. The feed rams 33—33 are arranged in three separate groups. One group comprises three adjacent feed rams 33—33 at the left hand side of the apparatus, as viewed in Fig. 4, which are attached commonly to a tie member 34. Another group comprises the three adjacent feed rams 33—33 at the right hand side of the apparatus, as viewed in Fig. 4, which are attached commonly to a tie member 35. The remaining two feed rams 33—33 at the center of the apparatus are attached commonly to a tie member 36 to form another group, as particularly seen in Fig. 5. Reciprocation of the feed rams 33—33 in the slideways is effected by piston rods 38, 39 and 40 of double acting pneumatic cylinders 41, 42 and 43, respectively. The piston rods 38, 39 and 40 are connected fixedly to the tie members 34, 36 and 35, respectively. The piston rods 38, 39 and 40 are normally retracted, whereby the feed rams 33—33 are held normally in their fully retracted positions as illustrated in Fig. 5. The feed ram linkage including the centrally positioned cylinder 42, the associated piston rod 39, the tie member 36, and the central pair of feed rams 33—33 is particularly shown in Fig. 5.

The guide passages 25—25 communicate individually with cylindrical bores 50—50 (Figs. 4 and 5) extending vertically through the guide plate 23. The upper ends of the bores 50—50 open into the slideways 32—32 immediately to the left of the leading ends of the feed rams 33—33, when the latter are in their fully retracted positions, as shown in Fig. 5. Slidably received within the cylindrical bores 50—50 are closely fitting, cylindrical, plug-like, feed fingers 51—51 (Figs. 3 and 5), which are mounted in three separate groups on vertically reciprocable carriage members 53, 54 and 55 (Fig. 3). One of these groups comprises the three adjacent feed fingers at the left hand side of the apparatus, as viewed in Fig. 3, which are mounted on the carriage member 53. Another group comprises the three adjacent feed fingers at the opposite side of the apparatus, which are mounted on the carriage member 55. The remaining two adjacent feed fingers 51—51 at the center of the apparatus are mounted on the carriage member 54.

The carriage members 53, 54 and 55 are connected to piston rods 57, 58 and 59, respectively (Fig. 3), of pneumatic cylinders 61, 62 and 63, respectively. The feed finger linkage including the centrally positioned cylinder 62, the associated piston rod 58, the carriage 54, and the central pair of feed fingers 51—51 is particularly shown in Fig. 5. The pneumatic cylinders 61, 62 and 63 are operable selectively to move their respective carriage members 53, 54 and 55 and associated groups of feed fingers 51—51 vertically between normal, retracted positions in which the upper faces of the feed fingers are flush with the bottoms of the guide passages 25—25, as shown in Figs. 4 and 5, and operative positions in which the upper faces of the feed fingers are flush with the bottoms of the slideways 32—32. In moving from its retracted position to its operative position, each of the feed fingers 51—51 transfers the leading grommet 10 from its associated guide passage 25 to the slideway 32 immediately thereabove.

The forward ends of the slideways 32—32 communicate with eight equally spaced, vertically extending, bores 70—70 (Figs. 4 and 5) formed in a head member 72, which is mounted transversely across the forward ends of the slideways. The upper ends of the bores 70—70 communicate with counterbores, one of which designated 73 is shown in Fig. 5, formed in the head member 72. Slidably mounted within the bores 70—70 and counterbores 73—73 are eight plungers 75—75 (Figs. 4 and 5) designed to be operated simultaneously by cooperating rocker arms 77—77, which are keyed upon a shaft 78. The shaft 78 is supported rotatably at each end in suitable bearings (not shown) and is operatively connected by a crank arm 80 and a hingedly connected link 81 to a piston rod 82 of a diaphragm type, pneumatic cylinder 85.

Each of the plungers 75—75 is resiliently biased to a raised position, as shown in Fig. 5, by an encircling compression spring 86 positioned in the counterbore 73. When the pneumatic cylinder 85 is actuated the shaft 78 is rotated counterclockwise, as viewed in Fig. 5, whereby all the plungers 75—75 are depressed simultaneously.

Each of the plungers 75—75 is formed with a reduced shank portion 87 having at its lower end a generally frustoconical tip 90 made of a resilient material, such as a cured neoprene compound, or the like, preferably having a Shore hardness of the order of 70 (type A Shore durometer). The free end of the tip 90 is rounded off slightly, as may be seen in Fig. 5. When a plunger 75 is moved to its operative, lower position, the resilient tip 90 thereof enters a constricting, tapered opening 91 at the lower end of the bore 70.

Anvil blocks 93, 94 and 95 (Fig. 3) are formed integrally with the carriage members 53, 54 and 55, respectively, and project horizontally to the left, as viewed in Fig. 5, beneath associated groups of the plungers 75—75. The anvil block 94 associated with the carriage member 54 is shown in detail in Fig. 5, and is representative of the general construction of anvil blocks 93 and 95.

The anvil block 94 is provided with two elongated, raised, spaced supports 97 and 98, which define an elongated recess 99. During a grommet inserting operation, the apertured wall 13 of a properly positioned cable terminal box 11 rests on the supports 97 and 98, and the row of apertures 14—14 therein are positioned over the recess 99 and are aligned with corresponding plungers 75—75. Stop members 100 and 102 (Fig. 3) are mounted on the left hand and right hand sides of anvil blocks 93 and 95, respectively, and are designed to facilitate the proper positioning of a cable terminal box 11 to insure the alignment of the apertures 14—14 with proper corresponding plungers 75—75.

Secured to the forward wall of the head member 72, as viewed in Fig. 5, is a header plate 105 provided with eight passages formed therein, one of which designated 107 is shown in Fig. 5. Each of the passages 107—107 communicates at one end thereof with an associated orifice 109 which, in turn, communicates with one of the bores 70—70. The opposite ends of the passages 107—107 communicate with a common supply line 110 through which a lubricant, such as castor oil, or the like, is supplied under relatively high pressure from a reservoir 112.

Figure 8:
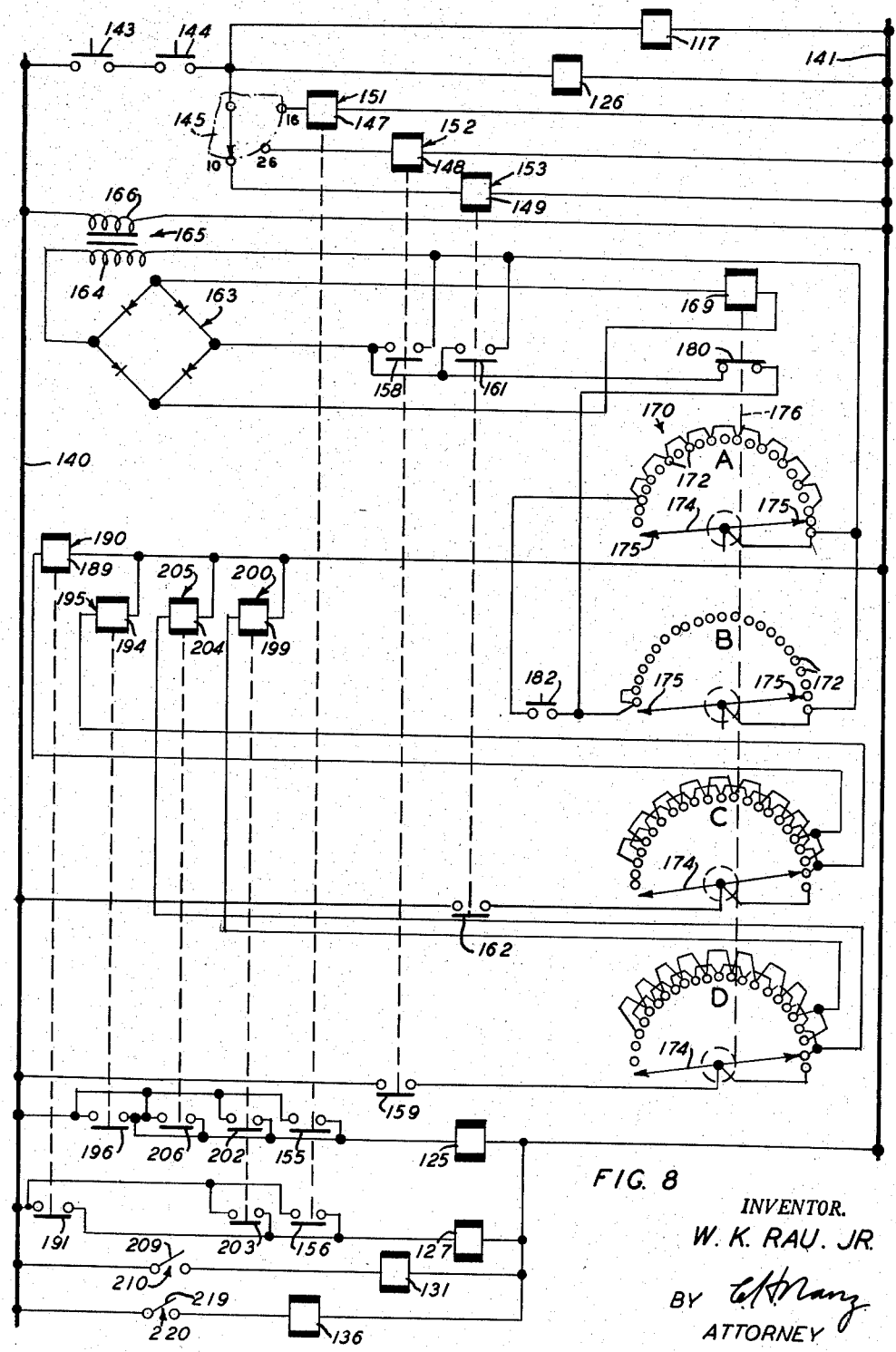
Fig. 8 is a schematic representation of an electrical control circuit forming part of the apparatus.

Interposed in the supply line 110 is a normally closed, solenoid operated valve 115 having a solenoid 117 (Fig. 8). When the solenoid 117 is energized, the lubricant is forced under high pressure through the orifices 109—109 where it emerges in the form of a fine mist which serves to lubricate the grommets 10—10.

Figure 7:
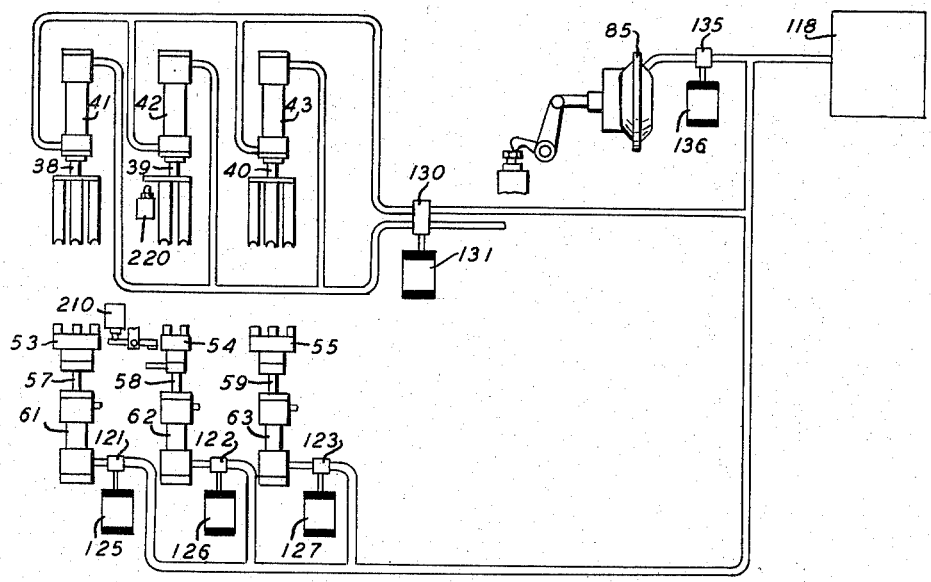
Fig. 7 is a schematic representation of a pneumatic circuit forming part of the apparatus.

Referring now to Fig. 7, there is shown a schematic representation of a pneumatic circuit forming a part of the apparatus. As illustrated in Fig. 7, the head ends of the pneumatic cylinders 61, 62 and 63 are normally disconnected from a supply 118 of compressed air and connected to exhaust by solenoid operated, three-way valves 121, 122 and 123 controlled by associated solenoids 125, 126 and 127, respectively. The piston rod ends of the cylinders 61, 62 and 63 are open to exhaust at all times. The weights of the carriage members 53, 54 and 55 are sufficient to return the piston rods 57, 58 and 59, respectively, to their lower inoperative positions when the head end of the respective cylinders are connected to exhaust.

The piston rod ends of the pneumatic cylinders 41, 42 and 43 (Fig. 7) are normally connected to the supply 118 through a solenoid operated, four-way valve 130 and the head ends thereof are normally disconnected from the supply and connected to exhaust. The valve 130 is operated by a solenoid 131 which, when energized, reverses the connections whereby the head ends of the cylinders 41, 42 and 43 are connected simultaneously to the supply 118 and their piston rods 38, 39 and 40, respectively, are operated to move the feed rams from right to left, as viewed in Fig. 5.

The pneumatic cylinder 85 is normally disconnected from the supply 118 and connected to exhaust by a solenoid-operated, three-way valve 135. The valve 135 is operated by a solenoid 136 which, when energized, connects the cylinder to the supply 118 whereby the piston rod 82 is operated to cause the plungers 75—75 to be depressed simultaneously.

Referring now to Fig. 8, there is shown a schematic diagram of an electrical circuit forming a part of the apparatus. The circuit includes busses 140 and 141 connected across a suitable source of single phase, A. C. voltage (not shown). As shown in Fig. 8, the solenoid 117, which operates the valve 115, may be connected across the busses 140 and 141 by the closure of a series arrangement of a pair of normally open, manually operated pushbutton contacts 143 and 144. The solenoid 126, which operates the valve 122, is connected in parallel with the solenoid 117. A three position, manually operated, selector switch 145 is designed to connect any one of three solenoids 147, 148 and 149 of solenoid operated relays 151, 152 and 153 in parallel with the solenoids 117 and 126.

The relay 151 (Fig. 8) is provided with two normally open contacts 155 and 156. Similarly the relay 152 is provided with two normally open contacts 158 and 159. The relay 153 is provided with two normally open contacts 161 and 162. The contacts 158 and 161 of the relays 152 and 153, respectively, are connected in parallel with each other and their parallel arrangement is, in turn, connected in series with a bridge-type rectifier 163 and a secondary winding 164 of a transformer 165. A primary winding 166 of the transformer 165 is connected directly across the busses 140 and 141.

When either one of the contacts 158 or 161 is closed, there results the energization of a D. C. operating solenoid 169 forming a part of a conventional step-by-step selector relay 170 having four contact banks, A, B, C and D each comprising twenty-three separate point contacts 172—172. Each of the four contact banks A, B, C and D is provided with a selector arm 174 having contact brushes 175—175 mounted at each end. The selector arms 174—174 are connected to a common shaft 176, and are designed to be indexed simultaneously one step in a counterclockwise direction each time the solenoid 169 is energized. The selector relay 170 is cocked each time the operating solenoid 169 is energized, and steps ahead one contact each time the solenoid is subsequently deenergized.

As shown in Fig. 8, the contact brushes 175—175 of contact banks A and B are connected at all times, through their first contacts 172—172, to the side of the secondary winding 164 of the transformer 165 to which one side of the parallel arrangement of the normally open contacts 158 and 161 is connected. The opposite side of the parallel arrangement of the normally open contacts 158 and 161 may be connected by the closure of a normally closed contact 180, which is operated by the solenoid 169, to the twenty-second and twenty-third terminal contacts 172—172 of contact bank B and to a normally open, manually operated, pushbutton reset contact 182 to the twenty-first contact 172 of contact bank A. As shown in Fig. 8, except for the first contact 172, all of the odd numbered contacts of contact bank A are connected commonly to one another.

The odd numbered contacts 172—172 of the contact bank C, except for the first and twenty-third contacts thereof are connected commonly together and in series with a solenoid 189 of a solenoid operated relay 190 to the bus 141. The relay 190 is provided with a normally open contact 191. The even numbered contacts 172—172 of the contact bank C, except for the twenty-second contact thereof, are connected commonly and in series with a solenoid 194 of a solenoid operated relay 195 to the bus 141. The relay 195 is provided with a normally open contact 196. The contact brushes 175—175 on the selector arm 174 of the contact bank C are connected to the first contact 172 thereof and also may be connected to the bus 140 by closure of the normally open contact 162 of the relay 153.

The odd numbered contacts 172—172 of the contact bank D, except for the first and twenty-third contacts thereof, are connected commonly and to the bus 141 through a series connected solenoid 199 of a solenoid operated relay 200. The relay 200 is provided with two normally open contacts 202 and 203. The even numbered contacts 172—172 of the contact bank D, except for the twenty-second contact thereof, are connected commonly and to the bus 141 in series with a solenoid 204 of a solenoid operated relay 205. The relay 205 is provided with a single, normally open contact 206. The first contact 172 of the contact bank D is connected to the brushes 175—175 of the contact arm 174 and then may be connected to the bus 140 by closure of the normally open contact 159 of the relay 152.

The contacts 155, 196, 202 and 206 of relays 151, 195, 200 and 205, respectively, are connected in parallel and their parallel arrangement is, in turn, connected across the buses 140 and 141 in series with the solenoid 125, which operates the valve 121. The contacts 156, 191 and 203 of relays 151, 190 and 200, respectively, are connected in parallel and their parallel arrangement is, in turn, connected across the busses 140 and 141 in series with the solenoid 127, which operates the valve 123.

The solenoid 131, which operates the valve 130, may be connected across the busses 140 and 141 by the closure of a normally open contact 209 of a conventional sensitive switch 210. The switch 210 is mounted on a bracket 212 (Fig. 5) depending from the platform 20, and is actuated by a pivoted actuator 213 having a roller 215 mounted on the free end thereof. The actuator 213 is engaged and operated by a striker 216 projecting from the anvil block 94 whenever the latter moves upwardly into its operative position.

The solenoid 136, which operates the valve 135, may be connected across the busses 140 and 141 by the closure of a normally open contact 219 of a conventional sensitive switch 220. The switch 220 (Fig. 5) is mounted on a bracket 222 depending from the pneumatic cylinder 85, and is actuated by a striker 226 mounted on a bracket 227 projecting upwardly from the time member 36. When the tie member 36 is moved to the left, as viewed in Fig. 5, by the piston rod 39, the striker 226 actuates the switch 220 to close the contact 219 at the end of the stroke.

*Operation*

To illustrate the operation of the grommet inserting apparatus, let it be assumed for example that it is desired presently to insert rubber grommets 10—10 in the apertures 14—14 of a cable terminal box 11 having ten such apertures. Preparatory to the grommet-inserting operation, an operator, after noting the number of apertures in the cable terminal box 11, presets the selector switch 145 manually at "position 10," whereby the solenoid 149 of the relay 153 is connected across the busses 140 and 141 in series with the normally open pushbutton contacts 143 and 144.

The operator then positions the cable terminal box 11 on the anvil blocks 93, 94 and 95, with the apertured wall 13 resting horizontally on the spaced supports, such as those designated by the numerals 97 and 98 in Fig. 5, and the left hand end of the cable terminal box in abutting contact with the stop member 100, as viewed in Fig. 3. The bottom of the cable terminal box 11, which is now positioned vertically is held in abutting contact with the forward sides of the anvil blocks 93, 94 and 95. With the cable terminal box 11 so positioned, the first eight apertures 14—14 thereof counting from the left in Fig. 3 are aligned with the vertical axes of the eight plungers 75—75 and the corresponding matching bores 70—70 in the plunger head 72.

Next, the operator manually depresses the pushbutton contacts 143 and 144 simultaneously to close these contacts. When the contacts 143 and 144 close momentarily, the solenoid 149 of the relay 153 is energized to close its associated contacts 161 and 162. It is assumed that the contact brushes 175—175 of the contact banks A to D, inclusive, of the selector relay 170 are positioned initially on their second contacts 172—172, as shown in Fig. 8, which is the normal starting position. The closure of the contact 162 completes a circuit through the second contact 172 of the contact bank C to energize the solenoid 194 of the relay 195, which closes the contact 196. The closure of the contact 196 energizes the solenoid 125, which actuates the valve 121. Simultaneously the solenoid 126 is energized through the momentarily closed contacts 143 and 144 to actuate the valve 122.

When the valves 121 and 122 are actuated, compressed air from the supply 118 enters the head end of the cylinders 61 and 62, thereby moving their associated carriage members 53 and 54 upwardly into their operative positions. The five feed fingers 51—51 carried by the carriage members 53 and 54 transfer the leading grommets from the five leftmost guide passages 25—25 to corresponding slideways 32—32 immediately thereabove. The cable terminal box 11 is carried upwardly on the anvil blocks 93 and 94 of the carriage members 53 and 54, respectively, and the apertured wall 13 of the terminal box is brought into very close proximity with the openings 91—91 at the lower ends of the bores 70—70.

When the carriage member 54 reaches its operative position at the end of the upward stroke of the piston rod 58, the striker 216 projecting therefrom engages and operates the actuator 213 to close the contact 209 of the switch 210. The closure of the contact 209 energizes the solenoid 131, which actuates the valve 130 to connect the head ends of the cylinders 41, 42 and 43 simultaneously to the supply 118 of compressed air. Thereupon the feed rams 33—33 are operated simultaneously and move from right to left, as viewed in Fig. 5, to feed the grommets 10—10 then positioned in the five leftmost slideways 32—32, as viewed in Fig. 4, into the corresponding bores 70—70. It may be readily seen, that, since the carriage member 55 so far has been inoperative, there are no grommets 10—10 positioned in the three rightmost slideways 32—32 and, hence, their corresponding bores 70—70 do not receive grommets.

At the end of the feed stroke of the piston rod 39, the striker 226 actuates the switch 220 and causes the contact 219 to close thereby energizing the solenoid 136. Energization of the solenoid 136 causes it to actuate the valve 135 so as to admit compressed air to the cylinder 85 from the supply 118. The piston rod 82 of the cylinder 85 is thus operated to rotate the shaft 78 angularly in a counterclockwise direction, as viewed in Fig. 5, whereby the eight plungers 75—75 are depressed simultaneously.

As the plungers 75—75 descend the resilient tips 90—90 of the five leftmost plungers engage the grommets 10—10 which have been fed to their associated bores 70—70. The resilient tips 90—90 of the plungers 75—75 cooperate with the constricting walls of the tapered openings 91—91 at the lower ends of the bores 70—70 to deform the grommets by bending upwardly the inner flange 17 (Fig. 2) as the latter are pushed downwardly and into the matching apertures 14—14 in the cable terminal box 11. At the end of the downward stroke of the plungers 75—75, the grommets 10—10 are forced from the constricting tapered openings 91—91 into the corresponding matching apertures 14—14 in the cable terminal box 11 with the peripheral flanges 16 and 17 of each of the grommets engaging the opposite sides of the wall 13. Thus, the five leftmost apertures 14—14 have been provided with grommets 10—10 properly seated therewithin.

The solenoids 125 and 126 which operate the carriage members 53 and 54, respectively, the solenoid 131 which operates the feed rams 33—33 and the solenoid 136 which operates the plungers 75—75 are subsequently deenergized when the operator releases the contacts 143 and 144 and allows them to open again. Hence, the carriage members 53 and 54, the feed rams 33—33 and the plungers 75—75 resume their inoperative positions preparatory to the next cycle of the apparatus, and the contacts 209 and 219 of the sensitive switches 210 and 220, respectively, reopen. One of the brushes 175—175 of each of the contact banks A to D, inclusive, of the selector relay 170 is indexed to the third contact 172 of the contact bank by virtue of the closing and subsequent opening of the contact 161 of the relay 153 during the cycle.

Now that five rubber grommets 10—10 have been inserted in the leftmost apertures 14—14 of the cable terminal box 11, the operator shifts the box to the left, as viewed in Fig. 3, so that the right hand end of the box is positioned in abutting contact with the stop member 102 on the anvil block 93. As before, the wall 13 of the cable terminal box 11 rests horizontally on the spaced supports 97 and 98 and the bottom of the box is held in abutting contact with the sides of the anvil blocks 93, 94 and 95. With the cable terminal box so positioned, the eight rightmost apertures 14—14 thereof, as viewed in Fig. 3, are aligned with the vertical axes of the eight plungers 75—75 and the corresponding bores 70—70 in the plunger head 72. It will be noted that three of the last-mentioned apertures 14—14 at the left have already been provided with rubber grommets 10—10.

The operator manually depresses the pushbutton contacts 143 and 144 simultaneously to close these contacts. When the contacts 143 and 144 close, the solenoid 149 of the relay 153 is energized and it closes the associated contacts 161 and 162. As mentioned previously, the contact brushes 175—175 of the contact banks A to D, inclusive, of the selector relay 170 are at this time positioned so as to engage the third contact 172 of each of the contact banks. Thus, the closure of the contact 162 completes a circuit through the third contact 172 of the contact bank C to energize the solenoid 189 of the relay 190, which closes the associated contact 191.

The closure of the contact 191 energizes the solenoid 127, which actuates the valve 123. Simultaneously the solenoid 126 is energized to actuate the valve 122. When the valves 122 and 123 are actuated, the carriage members 54 and 55 move upwardly together into their operative positions whereby the five feed fingers 51—51 carried thereby transfer the leading grommets from the five rightmost guide passages 25—25 to corresponding slideways 32—32 immediately above. The cable terminal box 11 is carried upward on the anvil blocks 94 and 95 of the carriage members 54 and 55, respectively, and the apertured wall 13 is brought into very close proximity with the openings 91—91 at the lower ends of the bores 70—70.

As described previously, the striker 216 on the carriage member 54 engages and operates the actuator 213 to close the contact 209 of the switch 210, whereby the feed rams 33—33 are operated simultaneously and move from right to left, as viewed in Fig. 5, to feed the grommets 10—10 then positioned in the five rightmost slideways 32—32, as viewed in Fig. 4, into the corresponding bores 70—70.

At the end of the feed stroke of the piston rod 39, the striker 226 actuates the switch 220 and the contact 219 closes to energize the solenoid 136, whereby the cylinder 85 is actuated to cause the plungers 75—75 to be depressed simultaneously. As the plungers 75—75 descend the resilient tips 90—90 of the five rightmost plungers engage the rubber grommets positioned in their associated bores 70—70 and force these grommets through the opening 91—91 and into the corresponding matching apertures 14—14 in the cable terminal box 11. Thus the five rightmost apertures 14—14, the only empty apertures remaining in the cable terminal box 11, are provided with rubber grommets 10—10 properly seated therewithin.

When the operator releases the contacts 143 and 144, the solenoids 126 and 127, the solenoid 131 and the solenoid 136 are subsequently deenergized and the carriage members 54 and 55, the feed rams 33—33 and the plungers 75—75 resume their inoperative positions. The contacts 209 and 219 of the sensitive switches 210 and 220, respectively, reopen and the selector relay 170 operates to index the brushes 175—175 of the contact banks A to D, inclusive, to engage the fourth contact 172 of each contact bank. The cable terminal box 11 containing a full complement of rubber grommets 10—10 properly seated in the ten apertures 14—14 formed therein is then removed by the operator and the machine is ready for a subsequent grommet inserting operation on another cable terminal box 11 having ten apertures.

However, if it is desired to perform the next operation on a larger terminal box, for example, one having sixteen circular apertures 14—14 requiring sixteen rubber grommets 10—10, the operator presets the selector switch 145 manually to "position 16." As may be seen from an analysis of the electrical circuit shown in Fig. 8, when the selector switch is so positioned, the grommet inserting machine will operate to insert simultaneously eight rubber grommets 10—10 in eight corresponding apertures 14—14 each time the pushbutton contacts 143 and 144 are depressed manually by the operator. In this manner eight rubber grommets 10—10 are inserted first in eight apertures at one end of the larger size cable terminal box. Then the cable terminal box is shifted to subsequently insert eight rubber grommets in the remaining eight apertures at the other end of the cable terminal box.

When it is desired to insert a full complement of rubber grommets 10—10 in the apertures of a cable terminal box having twenty-six apertures 14—14, the selector switch 145 is preset manually to "position 26." From an examination of the electrical circuit shown in Fig. 8 it is apparent that the grommet inserting apparatus is then preset to insert alternately five and eight grommets per operation of the pushbutton contacts 143 and 144, through alternate energization of the relays 205 and 200, respectively, each controlled by the associated contact bank D of the stepping relay 170.

The operator first positions the cable terminal box having twenty-six apertures 14—14 on the anvil blocks 93, 94 and 95 with the left hand end thereof in abutting contact with the stop member 100. The operator then closes the pushbutton contacts 143 and 144 and five grommets 10—10 are inserted in the five leftmost apertures 14—14 in the cable terminal box. Next, the operator shifts the cable terminal box further to the left, as viewed in Fig. 3, to position the next eight, empty apertures 14—14 therein under the eight plungers 75—75. The pushbutton contacts 143 and 144 are closed again, and eight grommets 10—10 are inserted, so that now the thirteen leftmost apertures 14—14 contain properly positioned grommets.

Again the operator shifts the cable terminal box to the left to position the next eight empty apertures 14—14 therein beneath the eight plungers 75—75, and then closes the pushbutton contacts 143 and 144. This time only the five leftmost plungers 75—75 insert grommets 10—10 in five corresponding apertures 14—14 in the cable terminal box. Thus, there remain eight empty apertures 14—14 in the cable terminal box. The eight remaining empty apertures 14—14 are the rightmost apertures. To complete the grommet inserting operation, the operator slides the cable terminal box further to the left, as viewed in Fig. 3, until the right hand end thereof is in abutting contact with the stop member 102. Then he closes the pushbutton contacts 143 and 144, whereupon eight grommets 10—10 are inserted in the remaining eight empty apertures 14—14 in the cable terminal box. The operation is now complete and the cable terminal box has a full complement of twenty-six rubber grommets 10—10.

It may be seen that each time the pushbutton contacts 143 and 144 are closed the solenoid 117 is energized. The solenoid 117, when energized, actuates the valve 115, whereby a mist of lubricant is injected into each of the bores 70—70. This mist of lubricant serves to lubricate the grommets 10—10 and the walls of the tapered openings 91—91 so as to facilitate the deformation and the passage of the rubber grommets through the tapered openings into the apertures 14—14 in the cable terminal boxes.

Referring again to Fig. 8, it may be seen, that by virtue of the connections to the contact bank B, the selector relay 170 resets itself to the normal start position when one of the brushes 175 of the latter contact bank engages the twenty-second contact 172 thereof. Also, by virtue of the connection to the contact bank A, the selector relay 170 may be reset to its normal start position, whenever the brushes 175—175 are in engagement with odd numbered contacts 172—172 of the contact bank, by depressing the reset pushbutton contact 182.

It will be understood that this invention is not limited to the specific details described in connection with the above embodiment of the invention. It is manifest that numerous embodiments and modifications thereof may be made without departing from the spirit and scope of the invention. For example, apparatus constructed in accordance with the teachings of the invention might be used to insert grommets in articles, other than the terminal boxes hereinabove described, having apertures formed therein, which might or might not be equally spaced.

What is claimed is:

1. Apparatus for selectively inserting grommets into apertures formed in workpieces which may have different numbers of grommet receiving apertures, which comprises means for supporting a workpiece in a position for receiving grommets in a first group of its apertures, means for supplying grommets, means for feeding grommets from said supply means and for inserting them into corresponding apertures in the supported workpiece, at least a portion of said feeding and inserting means comprising a plurality of spaced grommet engaging and moving members arranged in a number of separately operable groups, each group consisting of a number of the spaced members, a number of operating solenoids, one associated with and designed for operating each group of the spaced members, and electrical control means for energizing according to a preselected pattern of operation certain particular operating solenoids to initiate a predetermined sequence of grommet inserting steps, the workpiece being repositioned on its support between each step of the sequence so that further groups of its apertures are in grommet receiving position, whereby upon completion of the particular sequence of grommet inserting steps, grommets are inserted in each desired aperture of the particular workpiece, each particular pattern of operation being designed for permitting a sequence of grommet inserting steps in accordance with the number of apertures in particular associated workpieces; said control means comprising a stepping relay having a number of banks of individual point contacts and a contact arm for each bank movable sequentially into engagement with the individual point contacts thereof, one bank being provided for and associated with each desired pattern of operation, switching means designed for applying a potential to the contact arm of the contact bank provided for the particular number of apertures in the workpiece to be operated upon, a plurality of electrical circuits connected to successive point contacts of each bank and designed for energizing in a succession of steps the operating solenoids required by the particular pattern selected, and means for advancing said stepping relay to the next successive point contact upon completion of each grommet inserting step.

2. Apparatus for selectively inserting grommets into apertures formed in workpieces which may have different numbers of grommet receiving apertures, which comprises means for supporting a workpiece in a position for receiving grommets in a first group of its apertures, means for supplying grommets, a plurality of spaced feed members arranged in a number of separately operable groups of a number of adjacent feed members each, each feed member being designed upon operation of its group for engaging and feeding one grommet from said grommet supply means to an intermediate position adjacent to the workpiece, means for engaging all of the grommets fed to the intermediate position and for inserting them within corresponding apertures in the supported workpiece, a number of operating solenoids, one associated with and designed for operating each group of feed members, and electrical control means for energizing according to a preselected pattern of operation certain particular operating solenoids to initiate a predetermined sequence of grommet inserting steps, the workpiece being repositioned on its support between each step of the sequence so that further groups of its apertures are in grommet receiving position, whereby upon completion of the particular sequence of grommet inserting steps, grommets are inserted in each desired aperture of the particular workpiece, each particular pattern of operation being designed for permitting a sequence of grommet inserting steps in accordance with the number of apertures in particular associated work pieces; said control means comprising a stepping relay having a number of banks of individual point contacts and a contact arm for each bank movable sequentially into engagement with the individual point contacts thereof, one bank being provided for and associated with each desired pattern of operation, switching means designed for applying a potential to the contact arm of the contact bank provided for the particular number of apertures in the workpiece to be operated upon, a plurality of electrical circuits connected to successive point contacts of each bank and designed for energizing in a succession of steps the operating solenoids required by the particular pattern selected, and means for advancing said stepping relay to the next successive point contact upon completion of each grommet inserting step.

3. Apparatus for selectively inserting grommets into each of a plurality of apertures formed in workpieces which may have different numbers of grommet receiving apertures, which comprises means for supporting a workpiece in a position for receiving grommets in a first group of its apertures, means for supplying grommets, a plurality of spaced feed fingers designed for engaging and feeding one grommet each from said grommet supply means to a first intermediate position adjacent to the workpiece, a number of individually movable carriages, each of which support an associated group of a number of adjacent feed fingers, a number of fluid-actuated cylinders, one associated with and designed for operating each of said carriages, a number of operating solenoids one associated with and designed for operating each of said cylinders, means operable upon the advance of said carriages for engaging all of the grommets fed by the feed fingers to the first intermediate position and for delivering them to a second intermediate position in alignment with the corresponding apertures in the supported workpiece, a plurality of plungers operable upon delivery of grommets to the second intermediate position for engaging all of the grommets there delivered and for inserting them within the corresponding apertures in the supported workpiece, and electrical control means for energizing according to a preselected pattern of operation certain particular operating solenoids to initiate a predetermined sequence of grommet inserting steps, the workpiece being repositioned on its support between each step of the sequence so that further groups of its apertures are in grommet receiving position, whereby upon completion of the particular sequence of grommet inserting steps, grommets are inserted in each of the apertures of the particular workpiece, each particular pattern of operation being designed for permitting the insertion of grommets into each of the apertures of associated workpieces having particular numbers of apertures; said control means comprising a stepping relay having a number of banks of individual point contacts and a contact arm for each bank movable sequentially into engagement with the individual point contacts thereof, one bank being provided for and associated with each desired pattern of operation, switching means designed for applying a potential to the contact arm of the contact bank provided for the particular number of apertures in the workpiece to be operated upon, a plurality of electrical circuits connected to successive point contacts of each bank and designed for energizing in a succession of steps the operating solenoids required by the particular pattern selected, and means for advancing said stepping relay to the next successive point contact upon completion of each grommet inserting step.

References Cited in the file of this patent

UNITED STATES PATENTS

| | | |
|---|---|---|
| 2,208,584 | Jeffords et al. | July 23, 1940 |
| 2,374,358 | Kling et al. | Apr. 24, 1945 |
| 2,429,938 | Mansfield | Oct. 28, 1947 |
| 2,604,692 | Broden | July 29, 1952 |
| 2,710,934 | Senn | June 14, 1955 |
| 2,755,422 | Livingston | July 17, 1956 |
| 2,769,958 | Meadows et al. | Nov. 6, 1956 |

OTHER REFERENCES

Product Engineering August 1949, vol. 20, pp. 121–126.